Patented Mar. 10, 1953

2,631,104

UNITED STATES PATENT OFFICE 2,631,104

COCONUT PRODUCT

Paul L. Welker, New York, N. Y., Richard J. Boddington, Cranford, N. J., and Stewart J. Woodruff, New York, N. Y., assignors to The Glidden Company, Cleveland, Ohio, a corporation of Ohio No Drawing. Application September 30, 1949, Serial No. 119,014

3 Claims. (Cl. 99—125)

This invention relates to coconut, and relates particularly to prepared or packaged coconut of the character used for bakery, confectionary and household purposes.

It has long been customary to prepare sweetened shredded coconut by adding sugar, salt and water to the dried shreds of coconut, thereby to provide a product somewhat resembling the shreds of fresh coconut. It has also long been customary to include a relatively small amount of an humectant in such prepared coconut, to stabilize its moisture content and thereby to improve its tenderness. This invention is particularly concerned with the use of sorbitol as an humectant in sweetened shredded coconut.

It is an object of this invention to prepare shredded coconut with sorbitol as an humectant.

It is a further object to provide sorbitol-treated shredded coconut which has outstanding tenderness, flavor and color.

It is a further object to provide sweetened shredded coconut with characteristics which more nearly resemble shreds of fresh coconut, by treating the shredded coconut with sorbitol.

It is yet another object to replace with sorbitol at least a part of the sugar usually added to sweetened shredded coconut.

Still another object is to provide tender shredded coconut containing between about 2% and 8% of sorbitol, having a moisture content above about 8%, and having good color and flavor.

These and other objects will be apparent from the following description of the invention.

Glycerine has long been used as an humectant in shredded coconut, but because of its relatively ineffective fungicidal and bactericidal properties, glycerine does not permit the use of more than about 6% of moisture in the coconut. Higher moisture contents improve the tenderness of shredded coconut but also enhance the deterioration resulting from micro-organisms. Propylene glycol has been used somewhat in recent years in place of glycerine, permitting moisture contents of up to 15% and also inhibiting at least some of the deterioration tendencies which accompany such moisture levels. We have found, however, that propylene glycol imparts an unpleasant and objectionable bitter flavor when added in amounts of approximately 4% or more by weight of the treated, sweetened, coconut. We have observed that it also tends to cause a frequent yellowing of the coconut, and fails to stabilize the moisture content satisfactorily. That is, propylene glycol treated coconut gains moisture rapidly under conditions of high humidity, and loses moisture rapidly in desiccating atmospheres. Such fluctuations in moisture content lead to various problems and uncertainties when the coconut is marketed in the usual commercial packages.

We have now found that sorbitol is eminently suited for use as an humectant for shredded coconut. Sorbitol in a pure condition is crystalline and non-volatile in contrast with glycerine and propylene glycol which are both liquids and somewhat volatile at normal room temperatures. Hence sorbitol which has been introduced into coconut becomes a permanent part of its solids content. Furthermore, sorbitol has food value in contrast with propylene glycol which is substantially unassimilated by the human system. Moreover, sorbitol is sweet to the taste and is free of any bitterness such as accompanies propylene glycol at concentrations around and over about 4%. Accordingly, sorbitol can replace a part of the sugar of shredded coconut without loss of sweetness, and it can be used at concentrations well above 4%, thereby stabilizing high moisture contents such as moisture contents ranging up to 20%. Sorbitol also retards the fluctuations in moisture content due to ambient conditions, which occur in coconut treated with propylene glycol; that is, coconut which has been treated with sorbitol loses moisture slowly under dehydrating conditions, and gains moisture slowly under humidifying conditions. Thus it will be understood that sorbitol possesses numerous advantages over glycerine and propylene glycol as an humectant for shredded coconut. Higher concentrations can be used without impairing the flavor, and while improving tenderness and moisture stability. The sugar which can be omitted when sorbitol is added aids in offsetting some of the cost of the sorbitol, while the high moisture contents which can be stabilized when sorbitol is present impart a high order of tenderness to the coconut. Moreover, we have observed that the color of coconut which has been treated with sorbitol is not impaired to nearly the same extent as is the case when other commercial humectants are used for this purpose. Accordingly the use of sorbitol in shredded coconut leads to improved moisture stability, excellent tenderness, unimpaired color, and unimpaired flavor, while yet achieving the improvements on a favorable economic basis resulting from the reduced sugar requirements.

While sorbitol may be used in any desired amount ranging from fractions of a percent to relatively large concentrations, we prefer to use between about 2% and 8% by weight of the coconut. The sorbitol which is so used may be the pure crystalline compound, or the commercially available aqueous solutions of sorbitol in which the sorbitol may be associated or not with originrelated materials. We particularly prefer to use a sorbitol solution which is presently available commercially and which contains about 70% of crystallizable sorbitol, balance water.

The sorbitol may be infused into the coconut by any of the usual methods heretofore employed for preparing glycerine-treated or propylene glycol-treated coconut. One effective way is to place shredded coconut and an aqueous solution containing the desired amount of sorbitol and any sugar, salt, etc., which may be desired into a steam-jacketed kettle which revolves about an inclined axis, and therein tumbling the coconut while heating it.

It will be understood that small amounts of other humectants such as glycerine or propylene glycol may also be used in combination with sorbitol without impairing the effectiveness of the sorbitol.

The following table illustrates the superiority of sorbitol over propylene glycol as a stabilizer for the moisture content of sweetened shredded coconut. In the tests on which the table is based, various percentages of sorbitol and of propylene glycol were separately infused into different portions of a single batch of sweetened shredded coconut containing 8% moisture. Uniform, weighed quantities of each of the resulting treated portions were packed into cans of a uniform size and shape. The top end of each can was left open to the atmosphere. All of the cans were then stored in a chamber which protected the contents of each can from dust, chance contamination, etc., but which otherwise permitted the contents of all cans to be in effective contact with the ambient atmosphere. All cans were then weighed periodically to determine their respective losses in weight. The table summarizes the cumulative weight loss after the indicated periods of exposure had elapsed.

| Percent of— | | Total Loss of Weight in Percent After Elapsed Period of Exposure—Days of Exposure | | | | | | |
|---|---|---|---|---|---|---|---|---|
| Sorbitol | Propylene Glycol | 1 | 3 | 7 | 14 | 24 | 39 | 77 |
|  | 4 | 2.3 | 2.7 | 2.9 | 2.9 | 4.4 | 6.4 | 6.6 |
| 4 |  | .9 | 2.0 | 2.3 | 2.7 | 3.5 | 4.1 | 4.8 |
|  | 6 | 1.3 | 1.8 | 1.5 | 1.3 | 2.9 | 4.3 | 5.0 |
| 6 |  | 0.0 | 0.4 | 0.9 | 1 0.7 | 0.5 | 2.8 | 3.1 |
|  | 8 | 0.8 | 0.8 | 0.8 | 1 0.6 | 0.0 | 3.5 | 4.0 |
| 8 |  | 0.0 | 0.5 | 0.8 | 1 0.5 | 2.0 | 2.5 | 2.8 |

1 A gain in weight due to atmospheric conditions of high relative humidity.

It will be noted from the table that the sorbitol retarded the loss of moisture and also stabilized the moisture at all concentrations. It will also be noted that at the concentrations of 6% and 8%, the sorbitol-treated samples did not gain moisture nearly as rapidly as the propylene glycol samples when exposed to the high relative humidities which occurred between the 7th and 14th day. During the course of the test described above, the color of the various samples was noted, and it was apparent at the end of the test that the samples containing propylene glycol had darkened appreciably, while those containing sorbitol remained substantially unchanged. The darkening of the propylene glycol samples increased somewhat in proportion to the concentration of propylene glycol in the samples.

At the conclusion of the test, the tenderness of the various samples was compared, and it was found that the samples treated with sorbitol were appreciably more tender than were the samples treated with propylene glycol.

In another test of shredded coconut composed of coconut 55%, sugar 24%, moisture 13% and humectant 8%, one set of samples was prepared with sorbitol as the humectant, and another set of samples employed propylene glycol as the humectant. Both sets of samples were then packed into open cans (as in the test described above) and were placed in an incubator maintained at 98° F. Their respective losses in weight are shown below:

| Humectant | Total Loss of Weight in Percent After Exposure Time in Days | |
|---|---|---|
| Propylene Glycol | 5 Days {6.3% | 8 Days {6.5%. |
| Sorbitol | {4.5% | {4.9%. |

At the conclusion of this test, the samples treated with propylene glycol had darkened appreciably while those treated with sorbitol remained substantially unchanged in color.

From the foregoing tests it will be apparent that sorbitol-treated coconut may be packaged at the factory with a high moisture content conducive to tenderness, and may then be distributed to the ultimate consumer with more assurance than in the case of propylene glycol that the coconut will reach the consumer in a tender and "fresh" condition. It will also be understood that when the housewife or baker decorates a cake with sorbitol-treated coconut, the moisture-stabilizing effects of the sorbitol serve to keep the coconut tender and "fresh" for a longer time than would be the case with propylene glycol-treated coconut.

The following examples illustrate the manner in which sorbitol may be used in relatively large amounts as an humectant and sweetening agent with a corresponding reduction in the sugar content in comparison with a propylene glycol-treated coconut.

EXAMPLE 1

(Propylene glycol)

A sweetened shredded coconut was prepared from 200 lbs. of desiccated coconut (averaging 2% of moisture), 100 lbs. of sugar, 50 lbs. of added water, 13 lbs. of propylene glycol, and 2.5 lbs of salt.

EXAMPLE 2

(Sorbitol)

A sweetened shredded coconut was prepared from 200 lbs. desiccated coconut (2% moisture), 85 lbs. of sugar, 42.5 lbs. of added water, 28 lbs. of Sorbo (a commercial aqueous solution containing about 70% of d-sorbitol) and 2.5 lbs. of salt. It will be noted that 15 lbs. of sugar is here omitted, as compared with the formula of Example 1. The compositions of the two finished products after removal of moisture in a dryer are compared on a percentage basis, as follows:

|  | Example 1 | Example 2 |
|---|---|---|
|  | Percent | Percent |
| Coconut | 58.3 | 57.0 |
| Sugar | 29.1 | 24.6 |
| Total Moisture | 8.0 | 12.0 |
| Salt | 0.7 | 0.7 |
| Propylene Glycol | 3.9 |  |
| Sorbitol |  | 5.7 |
|  | 100.0 | 100.0 |

It will be apparent from the comparison that by using 5.7% of sorbitol instead of 3.9% of propylene glycol, the moisture content may be raised from 8% to 12%, and the sugar content may be reduced from 29.1% to 24.6%. The additional water induces greater tenderness in the coconut, the larger proportion of humectant stabilizes the extra water so as to maintain the improved tenderness for a longer period of time. The reduction in sugar and the higher moisture make it economically advantageous to use the higher humectant content and thereby to supply the ultimate consumer with the numerous improvements and advantages which attend the higher humectant content.

In summary it will be clear that sorbitol is advantageous as an humectant for coconut because of the following benefits which it confers:

1. Sorbitol permits the use of relatively high moisture content, thereby enhancing the tenderness of the coconut.
2. Sorbitol stabilizes the high moisture content by retarding the rate at which moisture is gained or lost.
3. Sorbitol may be used in larger concentrations than proplyene glycol without impairing the flavor or color of the coconut.
4. Sorbitol confers additional nutritional value to coconut.
5. Sorbitol confers some sweetness to the coconut, and permits a reduction in the sugar content of the sweetened coconut.
6. Sorbitol, being non-volatile, becomes a permanent part of the solids content of the sweetened coconut, and hence confers permanent plasticization and tenderness even when the moisture content of the sweetened coconut is low.
7. The benefits and advantages which attend the use of sorbitol may be secured on a favorable economic basis.

It will be apparent from the foregoing description that persons skilled in the art can utilize the benefits and advantages of sorbitol in a variety of ways within the scope of the invention disclosed herein and defined in the following claims.

Having now described our invention, what we claim is:

1. An edible shredded coconut product containing up to 20% moisture and containing sorbitol in an amount up to about 8% together with a small amount of propylene glycol, said product being characterized by greater tenderness than is evidenced by the product when the sorbitol is omitted.

2. An edible shredded coconut product as claimed in claim 1 wherein the amount of propylene glycol is insufficient to impart an objectionable bitter taste to said product, and wherein the sorbitol content is between about 2% and 8%, said product being additionally characterized by improved stability against deterioration in color on prolonged storage at atmospheric temperatures when compared with a like product from which the sorbitol has been omitted.

3. An edible shredded coconut product as claimed in claim 2 wherein the moisture content is between about 8 and 15%.

PAUL L. WELKER.
RICHARD J. BODDINGTON.
STEWART J. WOODRUFF.

REFERENCES CITED

The following references are of record in the file of this patent:

UNITED STATES PATENTS

| Number | Name | Date |
| --- | --- | --- |
| 2,183,173 | Segura | Dec. 12, 1939 |
| 2,338,184 | Kaufman | Jan. 4, 1944 |
| 2,505,746 | Straub | Apr. 25, 1950 |

OTHER REFERENCES

"Organic Chemistry," by Whitmore, D. Van Nostrand Co., Inc., pp. 567–77.

"Sorbitol," by W. H. Childs, The Manufacturing Confectioner, October 1945, pages 26 and 28.

"Synthetic Food Adjuncts," by M. B. Jacobs, D. Van Nostrand Co., Inc., New York city, 1947, page 188.